No. 677,296. Patented June 25, 1901.
G. A. WALL.
CIRCUIT TESTING AND RECORDING APPARATUS.
(Application filed Feb. 17, 1899.)
(No Model.) 4 Sheets—Sheet 1.
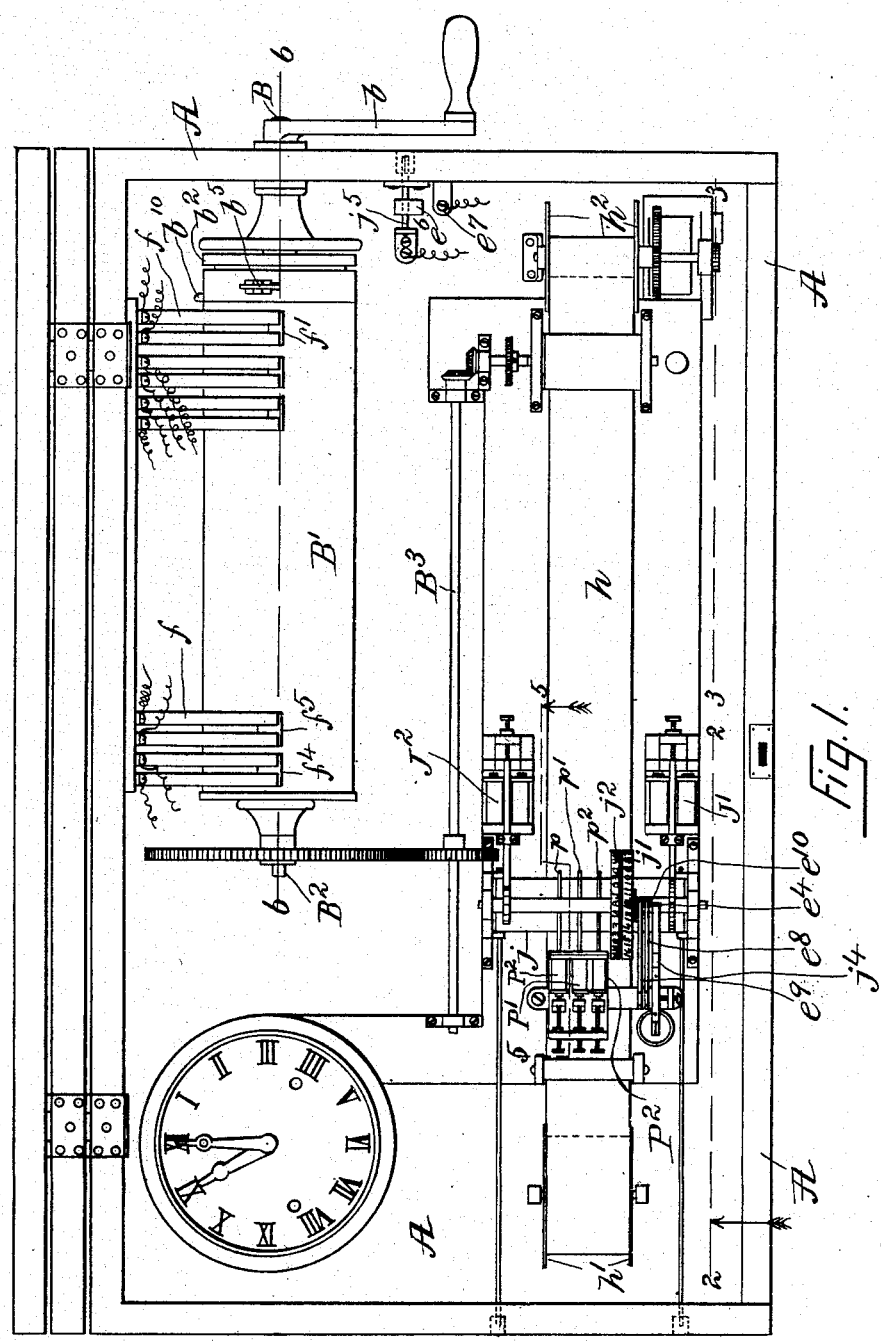

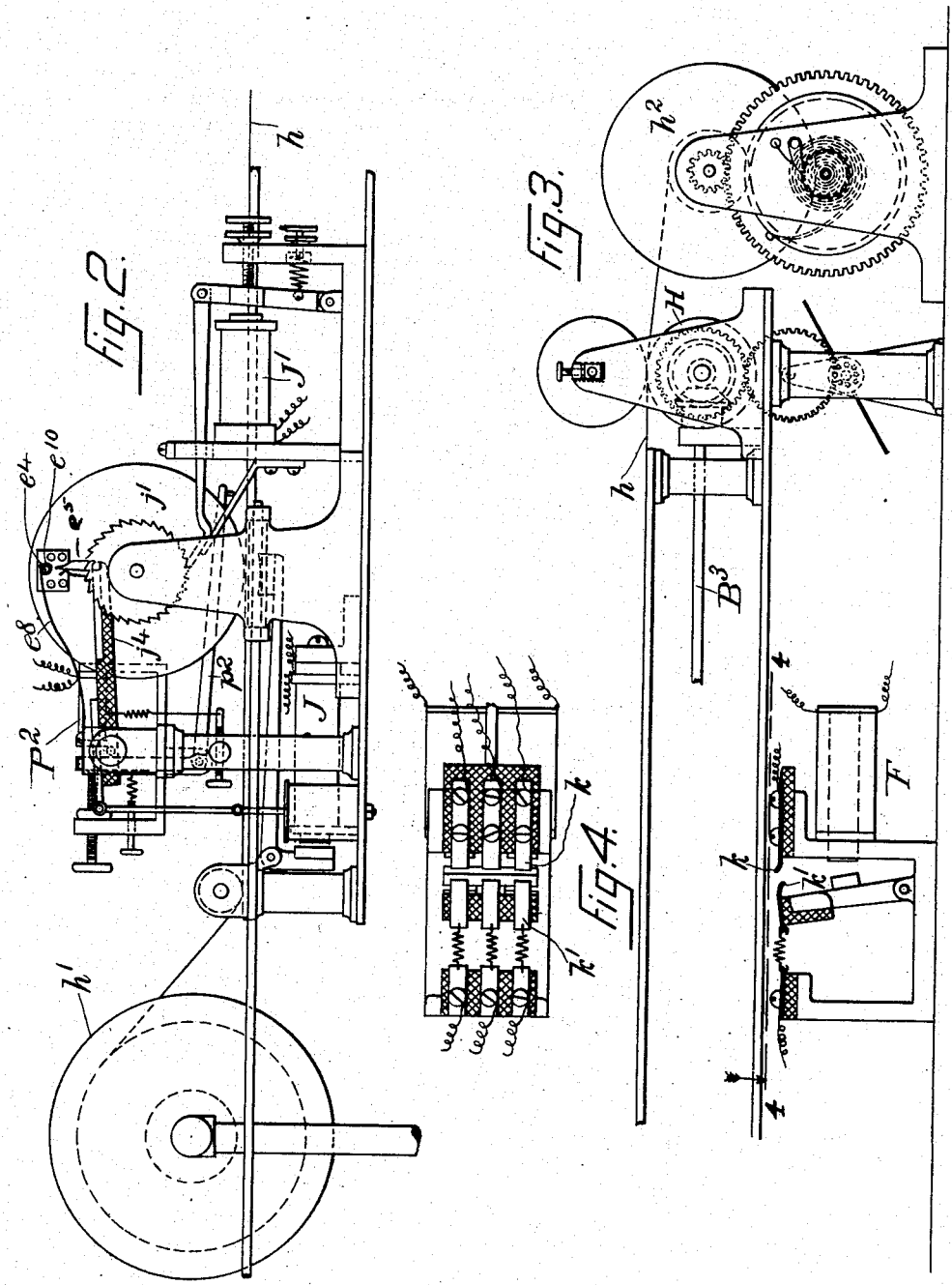

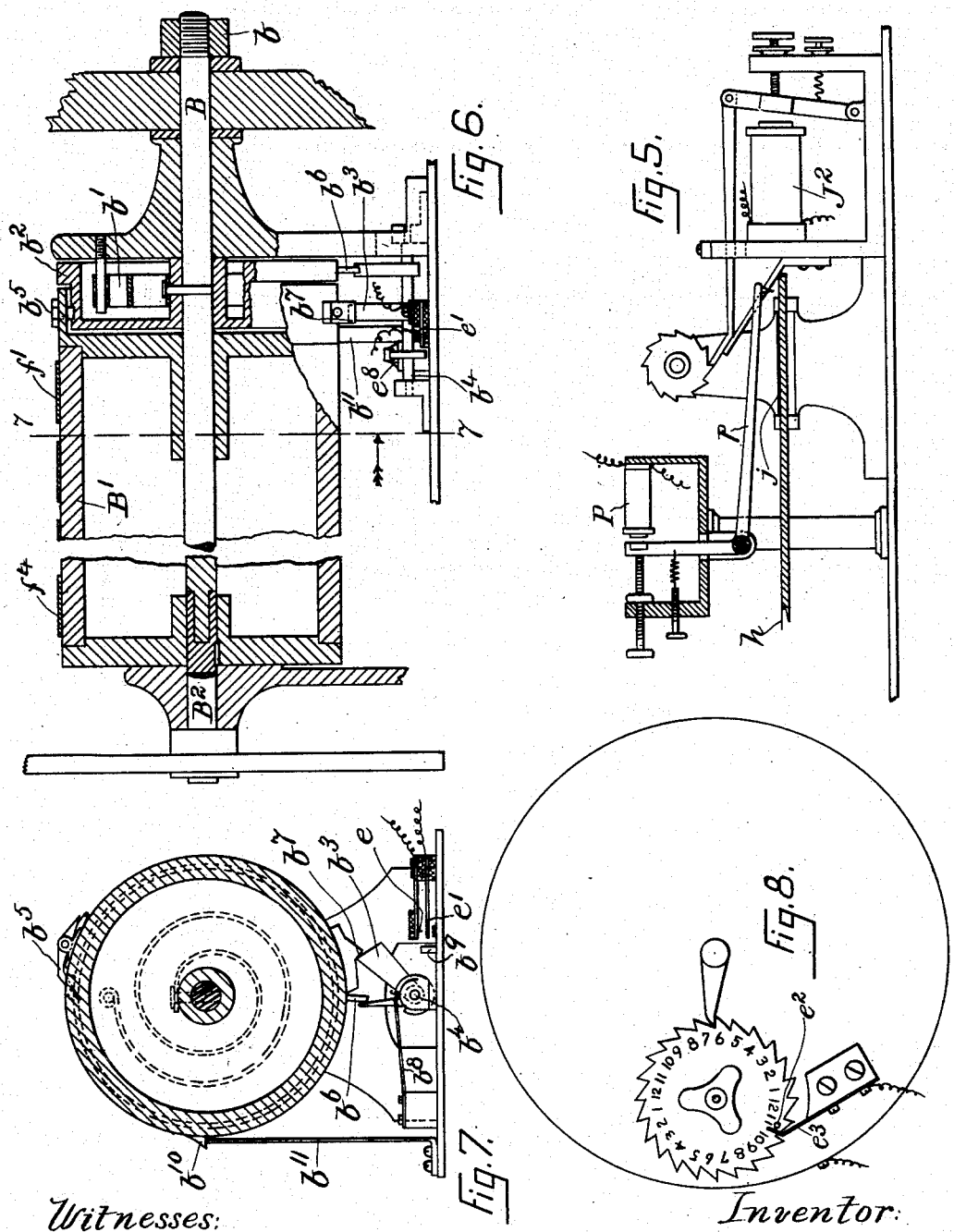

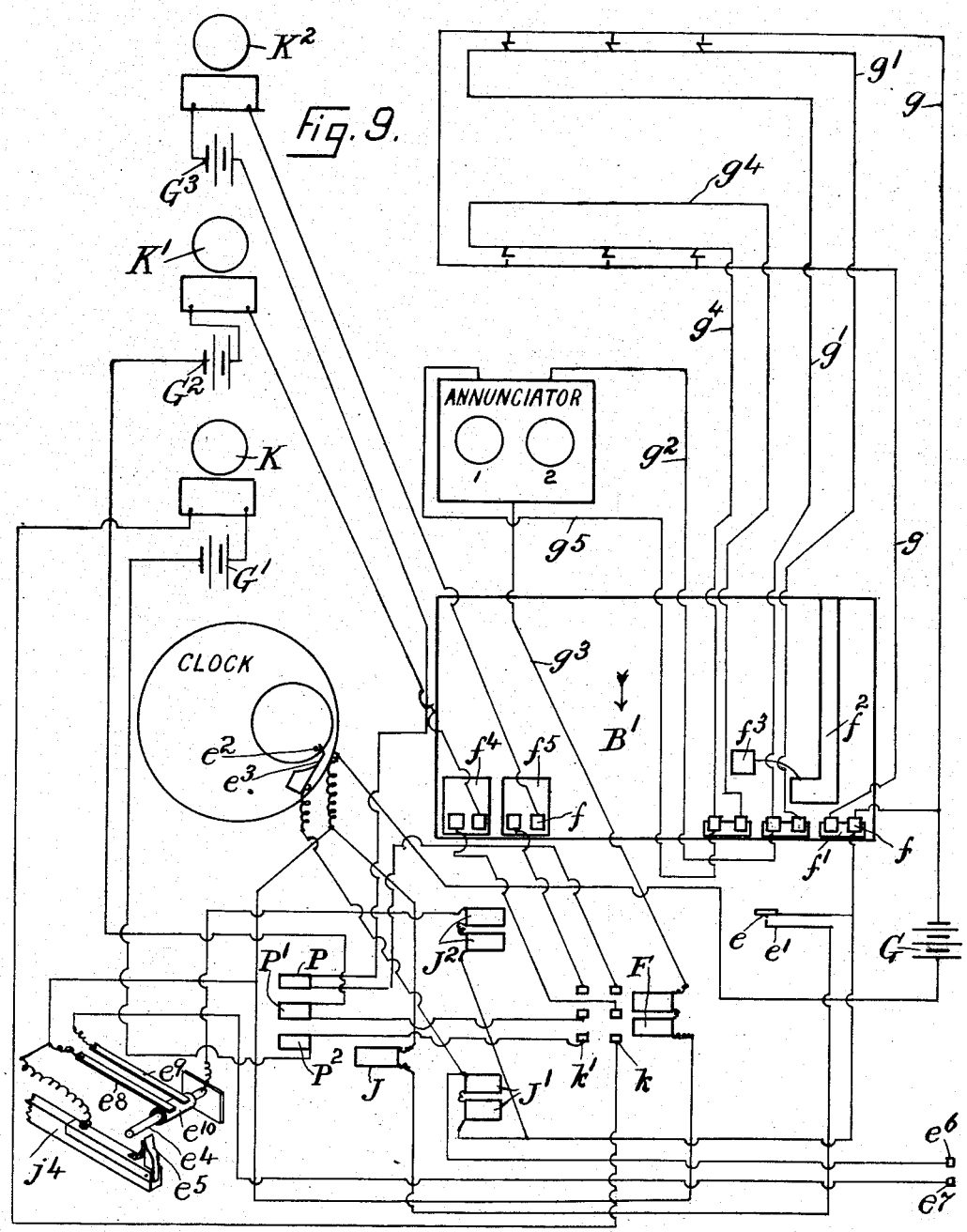

UNITED STATES PATENT OFFICE.

GEORGE AUGUSTUS WALL, OF PROVIDENCE, RHODE ISLAND.

CIRCUIT TESTING AND RECORDING APPARATUS.

SPECIFICATION forming part of Letters Patent No. 677,296, dated June 25, 1901.

Application filed February 17, 1899. Serial No. 705,923. (No model.)

*To all whom it may concern:*

Be it known that I, GEORGE AUGUSTUS WALL, of Providence, in the county of Providence and State of Rhode Island, have invented a new and useful Circuit Testing and Recording Apparatus, of which the following is a specification, reference being had to the accompanying drawings, in which—

Figure 1 is a plan of my invention shown inclosed in a case with a lid turned back; Fig. 2, an elevation of part of the apparatus, taken from line 2 2 of Fig. 1. Fig. 3 is a section on line 3 3 of Fig. 1. Fig. 4 is a section on line 4 4 of Fig. 3. Fig. 5 is a section on line 5 5 of Fig. 1. Fig. 6 is a section on line 6 6 of Fig. 1. Fig. 7 is a section on line 7 7 of Fig. 6. Fig. 8 is a detail, and Fig. 9 is a diagram, showing my apparatus as connected when in use. Figs. 2 to 7, inclusive, are on an enlarged scale for clearness.

My invention is especially designed for use with automatic-fire-alarm equipments, now largely used, for the practical value of such equipments depends very largely, if not wholly, upon the ease, rapidity, and certainty with which they can be tested; and my invention is an apparatus which when set in motion acts automatically to complete the circuits which are to be tested and to make a record of the condition of those circuits while returning to its normal condition, one important feature of novelty being that my apparatus must be wound up completely before it can be started, so that when once started it is certain to return to its normal condition.

In the best form of my apparatus shown in the drawings, A is a box with a lid, partly of glass, which contains the apparatus, the lid being locked to prevent improper interference with the apparatus, while the record made by the apparatus is visible through the glass of the lid.

The main shaft B of the drum B' projects from the box and is operated by a handle $b$. When the main shaft B is turned by the attendant in a direction to put the mainspring $b'$ under proper tension, the drum B' will be automatically connected with the main shaft and the mainspring when the handle has been turned far enough—in practice a little more than a full revolution—and the drum B' will be moved by the force of the mainspring, when the handle is released, until the drum brings up against a stop—that is, occupies its normal position. In the drawings the drum B' is moved by the mainspring $b'$ one full revolution and force is applied through the handle $b$ to turn main shaft B against the force of the mainspring.

The details of construction are as follows: The barrel $b^2$ of mainspring $b'$ is fast to main shaft B, and one end of mainspring $b'$ is also fast to the barrel or to the main shaft, while the other end of the mainspring $b'$ is fast to the bearing of the main shaft or to some other fixed support. (See Fig. 6.) When main shaft B is turned to wind up the mainspring $b'$, drum B' is held from turning by the pawl $b^3$ on rock-shaft $b^4$; but when main shaft B and barrel $b^2$ have been turned a little more than one revolution the toe of spring-pawl $b^5$, fast to drum B', engages a recess in barrel $b^2$, thus locking drum B' to barrel $b^2$, and as soon as the drum B' and barrel $b^2$ are thus connected a projection $b^6$ on barrel $b^2$ engages an arm on rock-shaft $b^4$ and swings that shaft into position to carry pawl $b^3$ out of the way of its tooth $b^7$, leaving drum B' free to move back with barrel $b^2$ and main shaft B. Pawl $b^3$ is moved farther than is necessary to release drum B', and this extra movement of pawl $b^3$ makes contact between electrodes $e\ e'$ and pawl $b^3$, then resting against stop $b^9$. As soon as shaft B, drum B', and barrel $b^2$ begin to move under the force of mainspring $b'$ the force of spring-electrode $e$ raises pawl $b^3$ slightly, and spring $b^8$ enters the second notch in the hub of rock-shaft $b^4$, thus holding pawl $b^3$ clear of tooth $b^7$ and breaking contact between $e$ and $e'$, for this contact energizes the printing-magnet and should be of brief duration. When main shaft B and barrel $b^2$ have moved back nearly one revolution, carrying drum B' with them, projection $b^6$ engages the other side of the arm on rock-shaft $b^4$ and returns pawl $b^3$ to its first position, and spring $b^8$ engages the first notch in the hub of rock-shaft $b^4$, thus holding pawl $b^3$ in the path of tooth $b^7$. As tooth $b^{10}$ on drum B' revolves with drum B' it lifts spring-pawl $b''$, which snaps under tooth $b^{10}$ when drum B' completes a revolution.

As drum B' revolves shaft $B^2$ revolves with it and compels shaft $B^3$ to revolve, and this shaft $B^3$ imparts motion to feed-roll H, which feeds the record-strip $h$, which is carried by the reel $h'$ and taken up by the take-up reel $h^2$, as will be clear to all skilled in the art without detailed description. As shown clearly in Fig. 3, roll H is connected with a fan or other suitable governor by a train of gears, so that the speed of roll H will be controlled. When the drum $B'$ is in its normal position, the contact-fingers $f$ are connected properly by the metal plates $f'$ on the drum $B'$, so that when either of the thermostats operates to electrically connect the two wires between which it is placed a circuit is completed through relay F and an alarm is given—that is, the equipment is in its normal condition, and the circuit through which the current passes when the apparatus is in its normal condition and one of the thermostats is actuated may be traced as follows: from the positive pole of battery G through the wire which terminates at the clock, from the clock through the wire which connects with magnet F, through coil of magnet F and wire $g^3$ to the annunciator, from the annunciator through wire $g^2$ to the fourth finger $f$, counting from the right, wire $g'$ to and through the thermostat which closed the circuit, through wire $g$ to the negative pole of the battery; but when the drum $B'$ is revolved by the force of the mainspring it first disconnects the fingers $f$ and reconnects them by plates $f^2$ and $f^3$ in such a way as to establish a circuit from battery G through thermostat-wires $g$ and $g'$, annunciator-wire $g^2$, and relay-wire $g^3$—that is, the fingers are first disconnected and the second and third, counting from the right of Figs. 1 and 2, are connected for testing the first-floor circuit. As the drum revolves the second and fifth fingers $f$ are connected, and a circuit is established through thermostat-wires $g$ and $g^4$, annunciator-wire $g^5$, and relay-wire $g^3$. I have shown but two floors; but it will now be clear that any number of thermostats or other circuits can be tested, as already described, for these two floors.

When relay-magnet F is energized, it closes the three bell-circuits, (shown in Figs. 3, 4, and 9;) but as long as each bell-circuit is energized it operates each its own pricker, and thereby makes a record on the strip $h$. The strip $h$ is carried under the prickers from supply-reel $h'$ to take-up reel $h^2$ by the feed-roll H. One pricker $p$ and its magnet P are shown in detail in Fig. 5 and will be well understood without explanation, and each pricker is in its own bell-circuit, the record on strip $h$, made by the pricker, indicating strictly which bell is ringing, but showing, in fact, that the main wire, by which like sides of all the thermostats are connected, is in order and also showing that the floor-wire connecting the other sides of all the thermostats on the floor being tested is in order and also showing that the annunciator-wire, the relay-wire, and the bell-circuit wires are in order.

The date of the test is recorded by making the contact at $e$ $e'$, as above described, and thereby energizing magnet J, which presses strip $h$ against the usual ink-ribbon $j$, lying between strip $h$ and date-wheels $j'$ $j^2$. The circuit over which the current passes when the magnet J is energized may be traced as follows: from the positive pole of battery G through the wire which terminates at the clock, from the clock through the wire which branches to the right and terminates at magnet J, through the coil of magnet J, through the wire terminating at $e'$, through $e'$ to and through $e$, through the wire terminating at the first finger $f$ counting from the right, from finger $f$ to the negative pole of the battery, through the wire which connects finger $f$ with wire $g$, and wire $g$. These date-wheels are automatically shifted by the clock—that is, the clock once each twenty-four hours makes a contact between electrodes $e^2$ $e^3$, Fig. 8, and thereby energizes magnet $J'$, which moves day-wheel $j'$ one step. The circuit over which the current passes when the magnet $J'$ is energized may be traced as follows: from the positive pole of battery G through the wire which terminates at the clock, through the clock to $e^2$, from $e^2$ to and through $e^3$, from $e^3$ through the wire which terminates at magnet $J'$, through the coil of magnet $J'$, from magnet $J'$ through the wire which terminates at the first finger $f$, from finger $f$ through the wire which connects with wire $g$, and through wire $g$ to the negative pole of the battery G. After day-wheel $j'$ has been moved thirty-one days the pin-electrode $e^4$, fast to day-wheel $J'$, (which has lifted lever $j^4$ during the latter portion of the revolution of day-wheel $j'$,) drops lever $j^4$ and electrode $e^5$ on lever $j^4$ rubs upon electrode-pin $e^4$, thereby making contact between electrodes $e^4$ and $e^5$ and enegizing magnet $J^2$, which moves month-wheel $j^2$ one step. The circuit over which the current passes when magnet $J^2$ is energized may be traced as follows: from the positive pole of battery G through the wire which terminates at the clock, from the clock through the branch wire leading to the left, to and through the next wire which branches to the left and which terminates at lever $j^4$, from $j^4$ to and through $e^5$, from $e^5$ through $e^4$, from $e^4$ through the wire which terminates at magnet $J^2$, through the coil of magnet $J^2$, from magnet $J^2$ through the wire which joins that wire which leads from magnet $J'$, thence to and through the first finger $f$, and wire $g$ to the negative pole of the battery G.

Months having fewer than thirty-one days are provided for by the electrodes $e^6$ and $e^7$, which can be brought into contact by a key on the arbor $j^5$ to energize day-wheel magnet $J'$ through electrodes $e^8$ $e^9$ when they are connected by sleeve-electrode $e^{10}$, carried by pin-electrode $e^4$. The circuit over which the current passes when the day-wheel is actuated by closing contacts $e^6$ and $e^7$ may be traced as follows: from the positive pole of battery G through the wire which terminates at the clock, from the clock through the wire which branches therefrom to the left, to and through the next wire which branches to the left to $e^8$, from $e^8$ to $e^{10}$, from $e^{10}$ to $e^9$, from $e^9$ through the wire which terminates at $e^7$, from $e^7$ to $e^6$, from $e^6$ through the wire which terminates at magnet J', through the coil of magnet J', from magnet J' through the wire which terminates at the first finger $f$, through finger $f$ and wire leading therefrom to and through wire $g$, to the negative pole of battery G. These electrodes $e^8$ and $e^9$ are connected by $e^{10}$ only during the latter part of each month—that is, on the 28th day of the month electrode $e^{10}$ connects electrodes $e^8$ and $e^9$—and if the month be February and the year not a leap-year after the test for that day has been taken the attendant will connect electrodes $e^6$ and $e^7$ once to move the day-wheel one step or to the 29th, again to move it to the 30th, and again to move it to the 31st, when it will automatically be changed by the action of the clock to the 1st and the month-wheel to March.

The bell-circuits, as shown in Fig. 9, are three in number—that is, one for the local bell, commonly called the bell "at the risk" or place insured, and the others each for its own station, commonly "outside." The bell at risk K rings whenever and so long as relay-magnet F is energized, for its circuit starting from the left pole of bell K is through electrodes $k$ and $k'$ of relay F, through pricker-magnet $P^2$ back to battery G' and bell K. The other two bells K' and $K^2$ are connected through fingers $f$, which are connected by plates $f^4$ and $f^5$; but this is simply to prevent bells K' and $K^2$ from ringing during the whole of the test, for as soon as drum B' has moved far enough to carry plates $f^4$ and $f^5$ clear of fingers $f$ the circuit of bells K and $K^2$ are broken.

The operation is as follows: The attendant turns handle $b$ against the force of the main-spring $b'$ until pawl $b^3$ brings up on post $b^9$, and thereby locks barrel $b^2$ to drum B' and also makes the printing-circuit through printing-magnet J and records the date on strip $h$. He then leaves the apparatus under control of the mainspring $b'$, so that drum B' makes its revolution and is arrested by stop-pawl $b^3$ and locked by spring-pawl $b''$. The first effect of the revolution of drum B' is to carry plates $f'$ clear of the fingers $f$, that normally rest on plates $f'$, next to carry plate $f^2$ under the second and third fingers $f$, counting from the right of Fig. 9, and completing the first-floor test-circuit through the annunciator and relay-magnet F, and thereby completing the three bell-circuits. The strip $h$ is then in motion and the prickers $p$ $p'$ $p^2$ are making their record. Plate $f^2$ then clears the third finger, and plates $f^4$ $f^5$ clear their fingers, thereby breaking the first-floor test-circuit and the bell-circuits. Then plate $f^3$, which is electrically connected to plate $f^2$, acts with plate $f^2$ to connect the second and fifth fingers $f$, thereby completing the second-floor test-circuit through annunciator and relay, and also completing circuit of bell K and its pricker-magnet $P^2$, so that pricker $p^2$ makes a second record for the second floor. In practice there are usually more than two floors; but pricker $p^2$ makes a record for each floor, as above explained. The automatic interruption of the bell-circuits by the bells causes the prickers to vibrate.

The shifting of the date-wheels has already been fully explained.

It will now be clear that my invention in its best form comprises not only means for arranging the wires to be tested into test-circuits and recording means for showing the results of the tests, but also dating means for showing when each test was made, and I am the first to combine those three features, and this combination is the main feature of my invention.

Another feature of my invention is that the attendant has nothing to do in making the test but to turn a handle as far as it will go and then allow a spring or other source of power stored up by so moving the handle to operate the instrument.

Other features of my invention are the day-wheel, operated automatically by the clock and carrying a circuit-closer controlling a circuit through which the day-wheel may be operated by an attendant, so that the attendant cannot operate the day-wheel until the circuit through which the attendant operates the day-wheel has been automatically prepared by the operation of the day-wheel; also, the day-wheel carrying an electrode which automatically makes contact with another electrode only when the day-wheel has made one complete revolution, and thereby closes a circuit through the magnet of the month-wheel, and also certain other combinations of elements which are set forth in the claims.

What I claim as my invention is—

1. In a thermostatic alarm system the testing apparatus above described comprising a dating apparatus; a test-recording apparatus operated by each circuit to be tested; and automatic means for controlling the dating apparatus and the test-recording apparatus each independently of the other.

2. In a circuit-testing apparatus the combination of a carrier carrying connections for properly arranging the circuits to be tested; a power-storing device and means to connect the carrier with the power-storing device, while power is given out by the power-storing device and to disconnect them while power is stored up in the power-storing device; all substantially as described.

3. In combination a carrier carrying connections for properly arranging circuits to be tested; a power-storing device, a main shaft for storing up power in that device; means for turning the main shaft to store up power; an electric switch automatically closed when the main shaft has been turned as far as required, and automatically opened when the main shaft commences its return movement under the power given out by the power-storing device; and means to automatically connect the carrier and the power-storing device while the power-storing device is causing the return movement of the main shaft; all substantially as described.

4. In a circuit-testing apparatus in combination a clock; a day-wheel; a magnet for operating it; means controlled by the clock and controlling the circuit through the magnet which operates the day-wheel; a second circuit through that magnet; means by which the attendant may control that second circuit; and means carried by the day-wheel to prevent the control of the second circuit by the attendant, except when the day-wheel has nearly reached the end of a revolution, all substantially as described.

GEORGE AUGUSTUS WALL.

Witnesses:
HENRIETTA POWERS,
WILLIAM MAYNADIER.